May 28, 1968  L. W. BEMENT  3,385,972

SEQUENTIAL TIMER

Filed Nov. 23, 1964  2 Sheets-Sheet 2

INVENTOR.
LYLE W. BEMENT
BY
ATTORNEY

United States Patent Office 3,385,972
Patented May 28, 1968

3,385,972
SEQUENTIAL TIMER
Lyle W. Bement, New Whiteland, Ind., assignor to P. R. Mallory & Co. Inc., Indianapolis, Ind., a corporation of Delaware
Filed Nov. 23, 1964, Ser. No. 413,085
16 Claims. (Cl. 307—37)

ABSTRACT OF THE DISCLOSURE

Activation of a programmed sequential timer actuates a subinterval cam to couple a solenoid, a motor and a motor-starting relay in series to one of two power input terminals of the timer. Subsequent motion of the sub-interval cam couples across the input terminals the solenoid in parallel with the series-coupled motor and relay. Further motion of the timer cams connects the solenoid, motor and relay in series across the input terminals.

Figure 1:
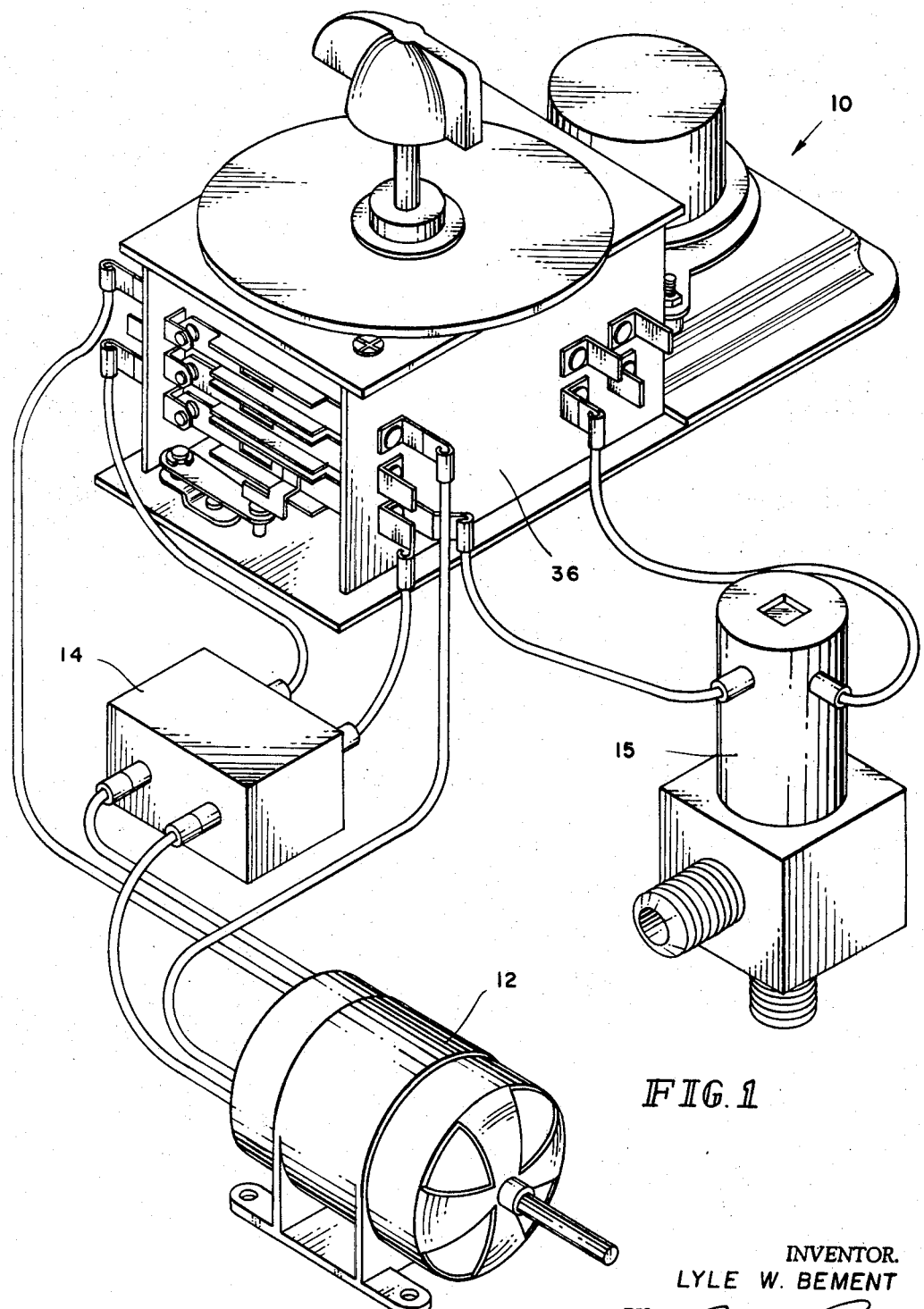

The present invention relates to an appliance control device, more particularly to an improved sequential timer for a dishwashing machine and the like which permits the elimination of a pressure switch without substantial alteration of the basic design of the sequential timer.

Sequential timers are known and have found utility in the control of the sequence of operations experienced by electrical appliances such as dishwashing machines and the like. As refinements are introduced in the electrical appliance field thereby making the dishwashing machine more commercially desirable, the need arises to perfect the sequential timer so as to eliminate components of the dishwashing machine that are no longer necessary.

Generally, in dishwashing devices a fluid container is filled against a predetermined interval of time. A pressure switch is the component of the dishwashing machine that is generally utilized as a safety means to prevent the fluid level in a fluid container of the dishwashing machine from exceeding a predetermined level thereby overflowing the container if a malfunction occurs in the timing device at the initial activation of the timing device. The pressure switch is sensitive to the fluid level and, therefore, if a predetermined depth of fluid is exceeded during a fill interval of a cycle program, the pressure switch deactivates the timing device thereby terminating fluid flow. It is seen that in dishwashing machines the mere activation of the timer causes the fluid container to fill with a fluid. The pressure switch will prevent further fluid flow into the fluid container of the machine upon the fluid exceeding a predetermined depth if the fill interval of the timer fails to deactivate the fill means of the timer.

If a malfunction is going to occur during the programmed cycle of operation of the timing device, the malfunction is most likely to occur in the sequential timer. More particularly, the malfunction is likely to occur at the initial activation of the timer. Thus, it is seen that although the sequential timer has failed, the fluid is allowed to flow into and thereby accumulate in the machine until the fluid exceeds a predetermined depth. The non-actuation of the wash cycle is the first instance the operator is aware that a malfunction has occurred in the programmed cycle of the timer. Generally, before the sequential timer can be repaired, the temperature of the fluid has dropped below its desired wash temperature and therefore must be discarded and replaced by other fluid having a more desirable wash temperature. I have found that by the use of a sub-interval cam assembly means operatively associated with the sequential timer, the pressure switch safety means may be eliminated. The sub-interval cam assembly means permits the sequential timer to be actuated prior to the initiation of the fill time interval thereby allowing the operator to ascertain whether or not the sequential timer will fail to perform its designated function prior to the machine being filled with a fluid. If the sequential timer malfunctions during the initial activation phase of the programmed cycle, by using my invention the malfunction will be apparent prior to the filling of the fluid container with fluid, thereby eliminating the probable waste of the fluid within the container.

Therefore, it is an object of the present invention to provide a sequential timer having means to prevent filing of a fluid container upon failure of the sequential timer to activate.

Another object of the present invention is to provide a sequential timer having a sub-interval cam assembly means which prevents filling of a fluid container upon failure of the sequential timer to activate.

Still another object of the present invention is to provide a sequential timer having optimum reliability characteristics afforded by a compact construction having a minimum number of parts.

Yet another object of the present invention is to provide a simple, efficient, effective, and accurate sequential timing device.

The present invention in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated other objects will be apparent to those persons possessing ordinary skill in the art. Other objects will appear in the following description, appended claims, and appended drawings. The invention resides in the novel construction, combination, arrangement, and cooperation of elements as hereinafter described and more particularly as defined in the appended claims.

The appended drawings illustrate the preferred embodiment of the present invention constructed to function in the most advantageous modes devised for the practical application of the basic principles involved in the hereinafter described invention.

Figure 2:
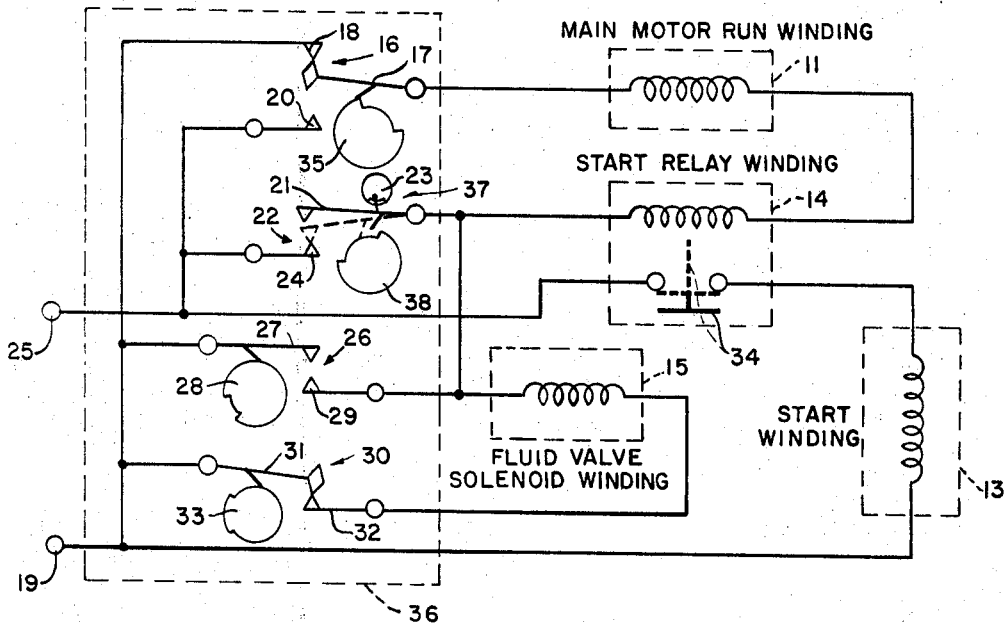
Figure 3:
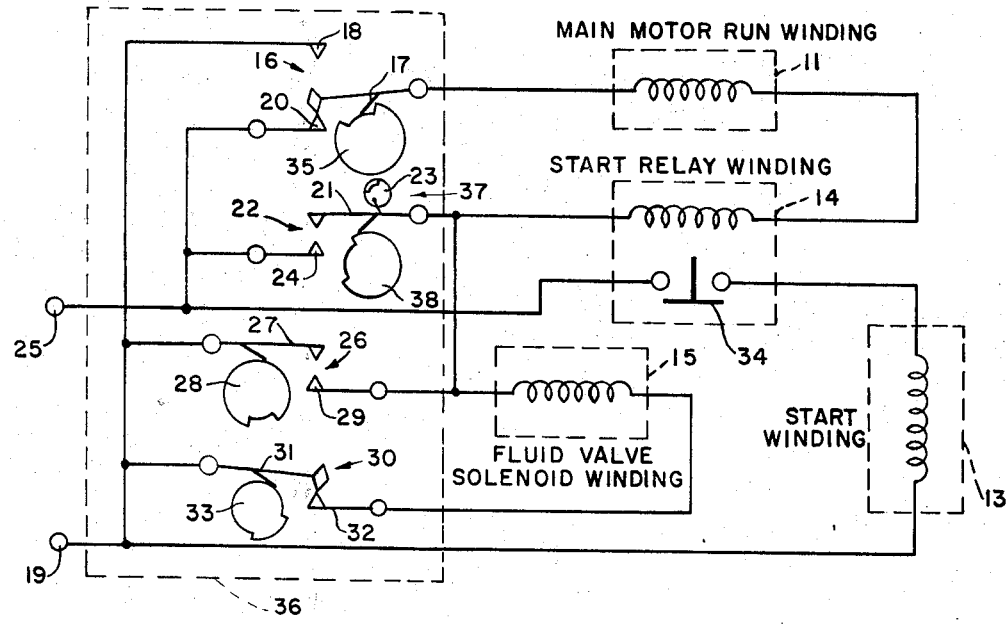

In the drawings:
FIGURE 1 is a perspective view of the sequential timer and several means operated by the timer.
FIGURE 2 is an electrical schematic of the present invention upon activation of the sequential timer.
FIGURE 3 is an electrical schematic of the present invention upon fill of the fluid container.

Generally speaking, the means and methods of the present invention relate to a device having a plurality of programmed operations. The device is coupled to an electric potential source by means of a plurality of input terminals. A timer included in the device is coupled to said source through the plurality of input terminals. The timer includes a cam assembly means having a plurality of intermittently actuated cam means for programming the operations of the device. The cam means includes a constant speed sub-interval cam assembly means for providing a sub-interval. A plurality of electrically energizable means including a normally off fluid solenoid means, a normally off relay means, and a normally off prime mover means are incorporated into the device. Activation of the sequential timer actuates a constant speed sub-interval cam means of the sub-interval cam assembly. The sub-interval cam means electrically couples in series by means of a follower switch from one of the input terminals back to that one input terminal for a predetermined interval of time, the solenoid, the relay and the prime mover. Thereafter, movement of the sub-interval means actuates the follower switch so as to electrically couple across the input terminals the combination of the solenoid in parallel with the series coupled prime mover means and relay means. Thereafter, an intermittent actuation of said cam assembly means electrically coupled in series across the input terminals the solenoid, the relay and the prime mover.

More particularly, the device of the present invention relates to electrical appliances such as dishwashers and the like having a plurality of programmed operations. The appliance has input terminals that are electrically coupled to an electric potential source. A sequential timer is coupled to the input terminals. The sequential timer has a cam assembly which includes a plurality of cams and operatively associated follower switches for programming the operations of the appliance and its associated electrically energizable components. The cams are intermittently actuated by an escapement means. The cams and associated follower switches include at least one sub-interval cam assembly means comprising a sub-interval cam and a follower switch. The sub-interval cam is directly coupled to the motor of the sequential timer and is displaced with a constant rotary speed. The operatively associated, electrically energizable components include a fluid solenoid means, a relay means, and a prime mover means. The fluid solenoid is normally off; however, the solenoid provides fluid to the appliance when the solenoid is energized. The solenoid is electrically coupled to the timer. The prime mover means is normally off; however, it provides a means for agitating the fluid when the fluid fills the appliance and for pumping fluid out of the appliance when required. The relay means is normally off and is used as a means for electrically coupling a start winding of the prime mover across the input terminals when the relay is energized. The relay means is electrically coupled between the timer and a run winding of the prime mover. Activation of the sequential timer and the cam assembly means actuates the constant speed sub-interval means of the sub-interval cam assembly means. The sub-interval cam assembly means electrically couples in series from one of the input terminals back to the same input terminal for a predetermined interval of time, the solenoid, the relay, and the prime mover. Thereafter, further peripheral movement of the sub-interval cam means actuates a follower switch of the sub-interval assembly to electrically couple across the input terminals the solenoid in parallel with the series connection of the prime mover and the relay. An intermittent actuation of the cam assembly means by the escapement means electrically couples in series across the input terminals, the solenoid, the relay and prime mover.

Referring now to the drawings, which illustrate the preferred embodiment of the present invention, it is seen that the sequential timer means is generally indicated by the numerial 10. The sequential timer includes an escapement means which intermittently indexes a plurality of cams which in turn actuate a plurality of follower switches. Generally, the sequential timer includes a motor, a gear train driven by the motor at a constant speed, an escapement coupled to the gear train for translating the constant motion of the motor into an intermittent output, the intermittent motion is transferred to the cams by any suitable means thereby actuating the cams with an intermittent motion at predetermined intervals of time, follower switches riding on the periphery of the cams are actuated by the displacement of the cams, and a sub-interval cam that is directly coupled to the timer motor. Construction details of the sequential timer have been limited to a brief description of the several components thereof since the sequential timer utilized is a standard item except for the use of the constant peripheral speed sub-interval cam assembly. A cam assembly means 36 of the timer is comprised of a plurality of cams and follower switches operatively associated with the cams.

A sub-interval assembly means 37, included within the cam assembly means, comprises sub-interval cam 23 and follower switch 22. Electrically coupled to the sequential timer in the manner illustrated in FIGURES 2 and 3 is motor 12 comprised of main motor run winding 11 and a start winding 13, a start relay winding 14, and a fluid valve solenoid winding 15. It is to be noted motor 12 is separate and distinct from the motor of the sequential timer. There is no direct cooperative relationship that exists between these two motors.

The position of the follower switches upon the activation of the sequential timer is indicated in FIGURE 2 by solid lines. Follower switch 16 has a follower arm 17 engaged with fixed contact 18. The follower arm rides on the periphery of cam 35 and is responsive to the rise and fall contours thereof. Upon activation of the sequential timer, the axial position of cam 35 is such that follower arm 17 is biased toward and engaged with fixed contact 18. Electrically coupled to follower arm 17 is a first extremity of main motor run winding 11. Fixed contact 18 is electrically coupled to input terminal 19 by any suitable electrically conductive wire means. A fixed contact 20 underlies the contact of the follower arm 17. It is seen the rise and fall contours of cam 35 determine whether the follower arm 17 is engaged with fixed contact 18 or fixed contact 20 or in the disengaged or neutral position. As disclosed hereinbefore upon activation of the sequential timer, follower arm 17 is engaged with fixed contact 18.

The second extremity of main motor run winding is electrically coupled to follower arm 21 of follower switch 22 by any suitable electrically conductive wire means. The start relay winding also has its second extremity electrically coupled to the first extremity of fluid valve solenoid winding 15.

Follower switch 22 is biased to the disengaged or neutral position by sub-interval cam 23 upon activation of the timer. Underlying the contact of follower arm 21 is fixed contact 24. Fixed contact 24 is coupled to input terminal 25 by any suitable electrically conductive wire means. At the activation of the sequential timer, cam 38 is axially positioned so that the follower arm riding on the periphery of the cam would be permitted to engage fixed contact 24 but for the sub-interval cam biasing the follower arm out of engagement with fixed contact 24 to a disengaged or neutral position. The follower arm 27 is coupled to input terminal 19 and the fixed contact is coupled to the first extremity of the fluid valve solenoid winding by any suitable electrically conductive wire means.

A follower switch 30 includes a follower arm 31 and a fixed contact 32. The follower arm 31 rides on the periphery of cam 33 and is responsive to the rise and fall contours thereof. The follower arm 31 is coupled to input terminal 19 whereas the fixed contact is coupled to the second extremity of the fluid valve solenoid winding by any suitable electrically conductive wire means. At activation of the sequential timer, cam 33 biases the follower arm into engagement with fixed contact 32.

Input terminal 19 is coupled to the first extremity of start winding 13 by any suitable electrically conductive wire means. The second extremity of the start winding is electrically coupled to the first extremity switch portion 34 of the start relay winding. The second extremity of the switch portion 34 is electrically coupled to input terminal 25.

Input terminals 19 and 25 are coupled across a source of electrical potential (not shown) by any suitable electrically conductive wire means when the sequential timer is activated.

Having described the structure comprising the present invention, the operative association between the described structural elements will be disclosed.

As disclosed hereinbefore, upon activation of the sequential timer input terminals 19 and 25 are coupled across a suitable alternating current source of potential energy. Cam 35 biases follower arm 17 into engagement with fixed contact 18. Cam 38 would bias follower arm 21 into engagement with fixed contact 24 but for sub-interval cam 23. The sub-interval cam, rotationally displaced at a constant, predetermined peripheral speed, biases follower arm 21 out of engagement with fixed contact 24. Cam 28 is axially positioned so as to bias follower arm 27 out of engagement with fixed contact 29. Cam 33 is so positioned so as to bias follower arm 31 into engagement with fixed contact 32. It is seen that an electrically conductive path can be traced from input terminal 19 to follower switch 30, through the follower switch to the second extremity of the fluid valve solenoid winding, through the fluid valve solenoid winding to the second extremity of the start relay winding, through the start relay winding to the second extremity of the main motor run winding, through the main motor run winding to follower switch 16, through the follower switch back to input terminal 19. The fluid valve solenoid winding is coupled in series with the main motor run winding and the start relay winding from input terminal 19 back to input terminal 19. Since none of these components appears across input terminals 19 and 25 but rather from input terminal 19 back to input terminal 19 there is no electric potential applied to the windings of the aforementioned components, therefore, there is no electric potential drop across the windings, hence none of the aforementioned components are energized. It is seen that the sequential timer is energized but that none of the components controlled by the timer are coupled across an electric potential source. Therefore, if a malfunction occurs upon activation of the timer, the ascertainment of the malfunction is not delayed until after the fluid container is filled but rather known prior to the actual fill of the container.

As the timer motor of the sequential timer advances the sub-interval cam at a constant peripheral speed, the contours of the sub-interval cam allow follower arm 21 to engage fixed contact 24 as shown by the dotted lines of FIGURE 2. The cam 38 operatively associated with follower arm 21 is axially positioned so as to permit follower arm 21 to engage fixed contact 24. It is seen that the aforementioned components are electrically coupled across terminals 19 and 25 when follower arm 21 engages fixed contact 24. An electrically conductive path is traced from input terminal 19 through follower switch 30 to the second extremity of the fluid valve solenoid winding, through the fluid valve solenoid to follower switch 22, through the follower switch to input terminal 25. In addition, an electrically conductive path can be traced from the first extremity of the fluid valve solenoid winding to the second extremity of the start relay winding, through the start relay winding to the second extremity of the main motor run winding, through the main motor winding to follower switch 16, through the follower switch to input terminal 19. The fluid valve solenoid winding is coupled in parallel with the series coupled start relay winding and the main motor run winding. An electric potential is now applied to the aforementioned components and each is energized. The normally open switch portion 34 of the start relay winding closes thereby electrically coupling the start winding across the input terminals 19 and 25. This movement is illustrated in solid and dotted lines in FIGURE 2. The motor 12 comprising the main motor run winding 11 and the starter winding 13 begins to run in the pump direction. With the fluid valve solenoid energized, fluid is permitted to purge the fluid container. The fluid flows through the container against time. When the purge time interval has elapsed, the follower arm 21 assumes the solid line position of FIGURE 2, thereby electrically coupling the fluid valve solenoid winding, the start relay winding, and the main motor run winding in series from terminal 19 back to terminal 19. These components are not coupled across an electric potential source, therefore, each of these windings are deenergized thereby terminating the purge cycle of the machine.

After the passage of a predetermined interval of time, the cam means of the sequential timer are actuated for the first time by the escapement since activation of the sequential timer thereby rotationally displacing the cams through a predetermined arcuate displacement. This time interval of the programmed cycle is called the fill portion of the wash cycle. The respective positions of the followers switches during a fill portion of the wash cycle are shown in FIGURE 3. Follower arm 31 engages fixed contact 32 and follower arm 17 engages fixed contact 20. Follower arm 29 and follower arm 21 are in a disengaged or neutral position. An electrical circuit can be traced from input terminal 19 through follower switch 30 to the second extremity of the fluid valve solenoid winding, through the fluid valve solenoid winding to the second extremity of the start relay winding, through the start relay winding to the second extremity of the main motor run winding, through the main motor run winding to the follower switch 16, through the follower switch to terminal 25. It is seen that the fluid valve solenoid winding, the start relay winding and the main motor run winding are electrically coupled in series across the input terminals 19 and 25. The impedance of the fluid valve solenoid to the impedance of the main motor run winding and to the impedance of the start relay winding in series is such that an electric potential drop appears mainly across the fluid valve solenoid winding thereby actuating the solenoid. The main motor run winding and the start relay winding having so little electric potential drop appearing across their respective impedances that neither of these windings is energized sufficiently to cause either to actuate. The energization of fluid valve solenoid is for a predetermined period of time as determined by the program characteristics of the sequential timer. It is seen that the fluid solenoid will not operate without the axial position of cam 33 being such that follower arm 31 is coupled to fixed contact 32. The motor 12 may be operated normally without actuation of the fluid valve solenoid winding and hence no flow of fluid into the fluid container when follower arm 31 is disengaged from fixed contact 32. To operate motor 12 in the washing condition follower arm 17 engages fixed contact 20 and follower arm 27 engages fixed contact 29. To operate motor 12 in the pumping direction under the influence of the sub-interval, follower arm 17 engages fixed contact 18 and follower arm 21 engages fixed contact 24. It is seen that by the structure utilized in the present invention that the timer motor of the sequential timer is activated prior to the fill cycle commencing. Since a major percentage of sequential timer malfunctions are experienced at the initiation of a timing cycle, by use of my invention the awareness of the malfunction is known prior to the fluid container filling, therefore, there is no ostensible need for the pressure switch safety device.

While the invention is illustrated and described in its preferred embodiment, it will be understood that modifications and variations may be effected without departing from the scope of the novel concepts of this invention and as set forth in the appended claims.

Having thus described my invention, I claim:

1. A device having a plurality of programmed operations comprising: an electrical source; a plurality of input terminals coupled to said source; a timer having a plurality of cam means for programming operations of said device, said means including a sub-interval cam, said cam means controlling a plurality of cam-operated switches coupled to said input terminals and to a plurality of electrically energizable component means; means for activation of said cam means and sub-interval cam, said sub-interval cam being operable to open one of said switches for electrically coupling in series from one of said input terminals back to said one input terminal for a predetermined interval of time said plurality of component means, thereafter said sub-interval cam actuating said one switch to electrically couple across said input terminals at least one of said component means in parallel with said other component means; said cam means being adapted for subsequent intermittent actuation of said switches to electrically couple in series across said input terminals said plurality of components.

2. A device having a plurality of programmed operations comprising: an electrical source; a plurality of input terminals coupled to said source; a timer having a plurality of intermittently actuated cam means for programming operations of said device, said means including a sub-interval cam moving at a constant peripheral speed, said cams controlling a plurality of switches coupled to said input terminals and to a plurality of electrically energizable component means; means for activation of said cam means and said sub-interval cam, said sub-interval cam being operable to open one of said switches for electrically coupling in series from one of said input terminals back to said one input terminal for a predetermined interval of time said plurality of component means, thereafter peripheral movement of said sub-interval cam actuating said one switch to electrically couple across said input terminals at least one of said component means in parallel with said other component means; said cam means being adapted for subsequent intermittent actuation of said switches to electrically couple in series across said input terminals said plurality of component means.

3. A device having a plurality of programmed operations comprising: an electrical source; a plurality of input terminals coupled to said source; a timer coupled to said input terminals, said timer having a plurality of intermittently actuated cam means for programming operations of said device, said means including a sub-interval cam moving at a constant peripheral speed, said cams controlling a set of cam-operated switches coupled to said input terminals and to a plurality of electrically energizable component means, each of said energizable component means having a predetermined impedance value; means for activation of said cam means and said constant speed sub-interval cam, said sub-interval cam being operable to open one of said switches for electrically coupling in series from one of said input terminals back to said one input terminal for a predetermined interval of time said plurality of components means, thereafter peripheral movement of said sub-interval cam actuating said one switch to electrically couple across said input terminals at least one of said component means in parallel with said other component means; said cam means being adapted for subsequent intermittent actuation of said switches to electrically couple in series across said input terminals said plurality of component means, said impedance value of one of said component being such that said one component means is actuated whereas said impedance values of said other components are such that said other components are not actuated when said component means are coupled in series.

4. A device having a plurality of programmed operations comprising: an electrical source; a plurality of input terminals coupled to said source; a timer having a plurality of intermittently actuated cam means for programming operations of said device, said means including a sub-interval cam moving at a constant peripheral speed, said cams controlling a set of cam-operated switches coupled to said input terminals and to a plurality of electrically energizable component means, each of said energizable component means having predetermined electrical characteristics; means for activation of said cam means and said constant speed sub-interval cam, said sub-interval cam being operable to open one of said switches for electrically coupling in series from one of said input terminals back to said one input terminal for a predetermined interval of time said plurality of component means, thereafter peripheral movement of said sub-interval cam actuating said one switch to electrically couple across said input terminals at least one of said component means in parallel with said other component means; said cam means being adapted for subsequent intermittent actuation of said switches to electrically couple in series across said input terminals said plurality of component means, said electrical characteristics of one of said components being such that said one component means is actuated whereas said electrical characteristics of said other components are such that said other components are not actuated when said components are coupled in series across said input terminals.

5. A device having a plurality of programmed operations comprising: an electrical source; a plurality of input terminals coupled to said source; timer having a plurality of cam means for programming operations of said device, said means including a sub-interval cam, said cams controlling a plurality of cam-operated switches coupled to said input terminals and to a plurality of electrically energizable component means, each of said energizable component means having a predetermined impedance value; means for activation of said cam means and said subinterval cam, said sub-interval cam being operable to open one of said switches for electrically coupling in series from one of said input terminals back to said one input terminal for a predetermined interval of time said plurality of component means, thereafter said sub-interval cam actuating said one switch to electrically couple across said input terminals at least one of said component means in parallel with said other component means; said cam means being adapted for subsequent actuation of said switches to electrically couple in series across said input terminals said plurality of component means, said impedance value of one of said component means such that said one component means is actuated whereas said impedance values of said other component means are such that said other components are not actuated when said component means are connected in series across said input terminals.

6. A device having a plurality of programmed operations comprising: an electrical source; a plurality of input terminals coupled to said source; a timer including a plurality of cam means for programming operations of said device, said means including a sub-interval cam, said cam means controlling a set of switches coupled to said input terminals; a normally off fluid solenoid means for providing fluid to said device when said solenoid is energized, said solenoid electrically coupled to said set of switches; a normally off prime mover means for agitating said fluid when said fluid fills said device; said prime mover means electrically coupled to said set of switches; a normally off relay means for electrically coupling a start winding of said prime mover across said input terminals when said relay means is energized, said relay means electrically coupled between said set of switches and a run winding of said prime mover; means for activation of said cam means and said sub-interval cam, said sub-interval cam being operable to actuate one of said switches for electrically coupling in series from one of said input terminals back to said one input terminal for a predetermined interval of time said solenoid, said relay means and said prime mover means, thereafter said sub-interval cam actuating said one switch to electrically couple across said input terminals said solenoid in parallel with a series coupling of said prime mover means and said relay means; said cam means being adapted for subsequent actuation of said set of switches to electrically couple in series across said input terminals said solenoid means, said relay means and said prime mover means.

7. A device having a plurality of programmed operations comprising: an electrical source; a plurality of input terminals coupled to said source; a timer including a plurality of intermittently actuated cam means for programming operations of said device, said means including a sub-interval cam moving at a constant peripheral speed, said cam means controlling a set of switches coupled to said input terminals; a normally off fluid solenoid means for providing fluid to said device when said solenoid is energized, said solenoid electrically coupled to said set of switches; a normally off prime mover means for agitating said fluid when said fluid fills said device; said prime mover means electrically coupled to said set of switches; a normally off relay means for electrically coupling a start winding of said prime mover across said input terminals when said relay means is energized, said relay means electrically coupled between said set of switches and a run winding of said prime mover; means for activation of said cam means and said constant speed sub-interval cam, said sub-interval cam being operable to actuate one of said switches for electrically coupling in series from one of said input terminis back to said one input terminal for a predetermined interval of time said solenoid, said relay means and said prime mover means, thereafter peripheral movement of said sub-interval cam actuating said one switch to electrically couple across said input terminals said solenoid in parallel with a series coupling of said prime mover means and said relay means; said cam means being adapted for intermittent actuation of said switches to electrically couple in series across said input terminals said solenoid means, said relay means and said prime mover means.

8. A device having a plurality of programmed operations comprising: an electrical source; a plurality of input terminals coupled to said source; a timer including a plurality of intermittently actuated cam means for programming operations of said device, said means including a sub-interval cam moving at a constant peripheral speed, said cam means controlling a set of cam-operated switches coupled to said input terminals; a normally off fluid solenoid means having predetermined, electrical characteristics for providing fluid to said device when said solenoid is energized, said solenoid electrically coupled to said set of switches; a normally off prime mover means having predetermined electrical characteristics for agitating said fluid when said fluid fills said device; said prime mover means electrically coupled to said set of switches; a normally off relay means having predetermined electrical characteristics for electrically coupling a start winding of said prime mover across said input terminals when said relay means is energized, said relay means electrically coupled between said set of switches and a run winding of said prime mover; means for activation of said cam means and said constant speed sub-interval cam, said sub-interval cam being operable to open one of said switches, thereby electrically coupling in series from one of said input terminals back to said one input terminal for a predetermined interval of time said solenoid, said relay means and said prime mover means, thereafter peripheral movement of said sub-interval cam actuating said one switch to electrically couple across said input terminals said solenoid in parallel with a series coupling of said prime mover means and said relay means; said cam means being adapted for subsequent intermittent actuation of said cam-operated switches to electrically couple in series across said input terminals said solenoid means, said relay means and said prime mover means, said electrical characteristic of said solenoid means being such that said solenoid means is actuated whereas said electrical characteristics of said relay means and said prime mover means are such that said relay means and said prime mover are not actuated when said solenoid means, said relay means and said prime mover means are coupled together in series across said input terminals.

9. A device having a plurality of programmed operations comprising: an electrical source; a plurality of input terminals coupled to said source; a timer including a plurality of intermittently actuated cam means for programming operations of said device, said means including a sub-interval cam moving at a constant peripheral speed, said cam means controlling a set of switches coupled to said input terminals; a normally off fluid solenoid means having a predetermined impedance value for providing fluid to said device when said solenoid is energized, said solenoid electrically coupled to said set of switches; a normally off prime mover means having a predetermined impedance value for agitating said fluid when said fluid fills said device; said prime mover means electrically coupled to said set of switches; a normally off relay means having a predetermined impedance value for electrically coupling a start winding of said prime mover across said input terminals when said relay means is energized, said relay means electrically coupled between said set of switches and a run winding of said prime mover; means for activation of said cam means and said constant speed sub-interval cam, said sub-interval cam being operable to open one of said switches for electrically coupling in series from one of said input terminals back to said one input terminal for a predetermined interval of time said solenoid, said relay means and said prime mover means, thereafter peripheral movement of said sub-interval cam actuating said one switch to electrically couple across said input terminals said solenoid in parallel with a series coupling of said prime mover means and said relay means; said cam means being adapted for subsequent intermittent actuation of said set of switches to electrically couple in series across said input terminals said solenoid means, said relay means and said prime mover means, said impedance value of said solenoid means being such that said solenoid means is actuated whereas said impedance values of said relay means and said prime mover means are such that said relay means and said prime mover means are not actuated when said solenoid means, said relay means and said prime mover means are coupled in series across said input terminals by said cam-operated switches.

10. A device having a plurality of programmed operations comprising: an electrical source; a plurality of input terminals coupled to said source; a timer including a plurality of cam means for programming operations of said device, said means including a sub-interval cam, said cam means controlling a set of switches coupled to said input terminals, one of said switches further being controlled by said sub-interval cam; a normally off fluid solenoid means having a predetermined impedance value for providing fluid to said device when said solenoid is energized, said solenoid electrically coupled to a pair of said switches, said pair of switches also being connected to one of said input terminals; a normally off prime mover means having a predetermined impedance value for agitating said fluid when said fluid fills said device; a run winding of said prime mover means electrically coupled to one of said switches and to a winding of a normally off relay means having a predetermined impedance value and having contacts for electrically coupling a start winding of said prime mover across said input terminals when said relay means is energized, said relay means being thereby electrically coupled between said switch being controlled by said sub-interval cam and said run winding of said prime mover; means for activation of said cam means and said sub-interval cam, said switch controlled by said sub-interval cam being operable to open for electrically coupling in series from one of said input terminals back to said one input terminal for a predetermined interval of time said solenoid, said relay means and said prime mover means, thereafter said sub-interval cam actuating said last-named switch to electrically couple across said input terminals said solenoid in parallel with a series coupling of said prime mover means and said relay means; said cam means being adapted for subsequent actuation of said set of switches to electrically couple in series across said input terminals said solenoid means, said relay means and said prime mover means, said impedance value of said solenoid means being such that said solenoid means is actuated whereas said impedance values of said relay means and said prime mover means are such that said relay means and said prime mover means are not actuated when said set of switches operates to connect said solenoid means, said relay means and said prime mover means in series across said input terminals.

11. A device according to claim 1 wherein said plurality of cam-operated switches comprises a first switch for selectively coupling a first of said component means to said input terminals; a second switch controlled by said sub-interval cam for coupling a second of said component means to a first of said input terminals; and third and fourth switches coupled to a third of said component means and to a second of said input terminals, said second and third component means further being directly coupled together electrically.

12. A device according to claim 11 wherein said component means have impedance values such that a predetermined one of said component means is activated when said component means are connected in series across said input terminals through said first and said fourth switches.

13. A device according to claim 6 wherein said set of switches comprises a first switch for coupling said prime mover means selectively to one of said input terminals; a second switch controlled by one of said cam means and by said sub-interval cam for coupling said relay means to one of said input terminals, said relay being further connected to said prime mover means; and third and fourth switches coupled to said solenoid means and to another of said input terminals.

14. A device according to claim 13 wherein a run winding of said prime mover means and a winding of said relay means are coupled in series between said first and said second switches, and wherein said relay means has a set of normally off contacts for coupling a start winding of said prime mover means across said input terminals upon activation of said relay winding.

15. A device according to claim 13 wherein the impedance values of said prime mover means, said relay means and said solenoid means are such that only said solenoid means is activated when all of said means are connected in series across said input terminals.

16. A device according to claim 13 wherein said solenoid means has an impedance value which is high in comparison with the impedance values of said prime mover means and said relay means.

References Cited

UNITED STATES PATENTS

| | | | |
|---|---|---|---|
| 3,135,908 | 6/1964 | Harris | 307—141 |
| 3,136,903 | 6/1964 | Trott | 307—141 |
| 3,199,525 | 8/1965 | Jellies | 134—57 |
| 3,221,754 | 12/1965 | Robson et al. | 134—58 |
| 3,271,877 | 9/1966 | Guenther et al. | 307—141 |

ORIS L. RADAR, *Primary Examiner.*

T. B. JOIKE, *Assistant Examiner.*